United States Patent
Peng

(10) Patent No.: US 12,334,796 B2
(45) Date of Patent: Jun. 17, 2025

(54) NOISE REDUCTION AND SHOCK ABSORPTION STRUCTURE FOR INPUT END OF A TUBULAR MOTOR

(71) Applicant: Harda Intelligent Technologies Co., Ltd., Fujian (CN)

(72) Inventor: KeSheng Peng, Fujian (CN)

( * ) Notice: Subject to any disclaimer, the term of this patent is extended or adjusted under 35 U.S.C. 154(b) by 222 days.

(21) Appl. No.: 18/227,291

(22) Filed: Jul. 27, 2023

(65) Prior Publication Data

US 2023/0369936 A1 Nov. 16, 2023

(51) Int. Cl.
*H02K 5/24* (2006.01)

(52) U.S. Cl.
CPC ........... *H02K 5/24* (2013.01); *H02K 2207/03* (2013.01)

(58) Field of Classification Search
CPC .............................. H02K 2207/03; H02K 5/24
See application file for complete search history.

(56) References Cited

U.S. PATENT DOCUMENTS

| | | | | |
|---|---|---|---|---|
| 2017/0211727 A1* | 7/2017 | Peng | .................... | B29C 66/1224 |
| 2019/0345703 A1* | 11/2019 | Peng | .................... | E03C 1/2306 |
| 2023/0378845 A1* | 11/2023 | Peng | .................... | H02K 7/14 |

FOREIGN PATENT DOCUMENTS

CN 210684244 U * 6/2020

OTHER PUBLICATIONS

CN-210684244-U, Chen, all pages (Year: 2020).*

* cited by examiner

*Primary Examiner* — Naishadh N Desai

(57) ABSTRACT

A noise reduction and shock absorption structure for an input end of a tubular motor, having a motor body and a fixing seat mounted inside a motor casing, and also a first shock absorption assembly arranged between an input end of the motor body and fixing seat to achieve buffering and shock absorption functions and to achieve noise reduction. The first shock absorption assembly has a first and a second connecters both made of hard materials, and a first and a second buffer pieces both made of soft materials.

10 Claims, 6 Drawing Sheets

NOISE REDUCTION AND SHOCK ABSORPTION STRUCTURE FOR INPUT END OF A TUBULAR MOTOR

BACKGROUND OF THE INVENTION

The present invention relates to the technical field of tubular motor, and more specifically relates to noise reduction and shock absorption structure for an input end of a tubular motor.

A tubular motor consists of three main sections: stroke, motor, and deceleration, all working inside a circular tube. The stroke section controls the upper and lower limits of the motor, the motor section is responsible for motor rotation, while the deceleration section mostly uses planetary reduction to slow down the motor speed and increase output torque.

Tubular motors are mainly used for electric rolling doors, where the motor is hidden inside a rolling tube and is controlled by a remote controller. As the motor rotates, it drives a transmission shaft to rotate and thus roll up or down the curtain. When being rolled up, the curtain is wound on the rolling shaft; when being rolled down, the curtain slides down along an inner side of a guide rail.

However, high-speed rotation of the motor causes frequent shaking, which is transmitted to the motor casing. As a result, vibration and noise occur between the motor casing and the rolling shaft, thereby creating a bad user experience. A current solution is to provide a buffer piece between the motor and the motor casing to absorb the vibration. However, this only solves the problem of vibration transmission between the motor and the motor casing. In fact, to prevent the motor's output shaft from deviating during operation, an output bracket and a fixing seat are installed on two ends of the motor respectively to keep both ends of the motor relatively fixed with the motor casing. This means that there is a rigid connection between the two ends of the motor and the motor casing. However, this rigid connection is easily affected by the preciseness in the assembly of different components, and can also cause vibration. Therefore, the noise reduction effect of an existing tubular motor is still not ideal and cannot be used in situations that require silent operation.

BRIEF SUMMARY OF THE INVENTION

In view of the aforesaid disadvantages now present in the prior art, it is an object of the present invention to provide a noise reduction and shock absorption structure for an input end of a tubular motor. The present invention can enhance the noise reduction and shock absorption effects between the input end of the tubular motor and the motor casing, thereby improving the quality of the tubular motor so that it can be used in situations that require silent operation.

To attain the above object, the present invention provides the following technical solutions:

A noise reduction and shock absorption structure for an input end of a tubular motor, comprising a motor casing, a motor body, a first shock absorption assembly, and a fixing seat; the motor body is provided inside the motor casing; the fixing seat is also provided inside the motor casing and fixed at an inner wall of the motor casing; a first wiring hole is opened through the fixing seat; the first shock absorption assembly comprises a first connecter and a second connecter, both made of hard materials, and also comprises a first buffer piece and a second buffer piece, both made of soft materials; a second wiring hole is opened through the first connecter, and a third wiring hole is opened through the second connecter; an input end of the motor body, the first connecter, the second connecter, and the fixing seat are sequentially and co-axially connected; the first buffer piece is positioned at a connecting portion between the first connecter and the second connecter; the second buffer piece is positioned at a connecting portion between the second connecter and the fixing seat to prevent direct contact between the first connecter and the second connecter, and also prevent direct contact between the second connecter and the fixing seat.

Said hard materials are metals or high-strength plastics; said soft materials are rubber or silicone.

An end surface of the input end of the motor body is provided with a plurality of first position limiting plates arranged on a periphery of the end surface of the input end of the motor body; one end portion of the first connecter facing towards the motor body is provided with a plurality of first position limiting grooves corresponding to the first position limiting plates; the first position limiting grooves are arranged around said one end portion of the first connecter facing towards the motor body; the first position limiting plates are inserted into the first position limiting grooves respectively.

One end of the first connecter facing towards the second connecter is provided with a first spline head; the second wiring hole extends through an end surface of the first spline head; one end of the first buffer piece is provided with a first spline hole, and another end of the first buffer piece is provided with a second spline head; the first spline hole extends through an end surface of the second spline head; one end of the second connecter facing towards the first connecter is provided with a second spline hole; the first spline head is sleeved by the first spline hole; the second spline head is sleeved by the second spline hole.

Preferably, a first stepped portion is formed around a peripheral surface of the first buffer piece; the second spline head is formed on an end surface of the first stepped portion and projected out therefrom; an end surface of the second connecter abuts against the first stepped portion.

Preferably, a peripheral surface of the first connecter is provided with a plurality of second position limiting plates; an end surface of the first buffer piece facing towards the first connecter is provided with a plurality of second position limiting grooves corresponding to the second position limiting plates; the second position limiting plates are inserted into the second position limiting grooves respectively.

An end of the second connecter facing towards the fixing seat is provided with a third spline head; the third wiring hole extends through an end surface of the third spline head; one end of the second buffer piece is provided with a third spline hole, and another end of the second buffer piece is provided with a fourth spline head; the third spline hole extends through an end surface of the fourth spline head; one end of the fixing seat facing towards the second connecter is provided with a fourth spline hole; the third spline head is sleeved by the third spline hole; the fourth spline head is sleeved by the fourth spline hole.

Preferably, a second stepped portion is formed around a peripheral surface of the second connecter; the third spline head is formed on an end surface of the second stepped portion and projected out therefrom; a third stepped portion is formed around a peripheral surface of the second buffer piece; the fourth spline head is formed on an end surface of the third stepped portion and projected out therefrom; an end surface of the second buffer piece abuts against the second stepped portion, and an end surface of the fixing seat abuts against the third stepped portion.

A peripheral surface of the fixing seat is provided with a first shock absorption sleeve; the first shock absorption sleeve is elastically fixed between the fixing seat and the inner wall of the motor casing.

A second shock absorption assembly is provided between a peripheral surface of the motor body and the inner wall of the motor casing; the second shock absorption assembly comprises a sealing sleeve sleeving the motor body, and a plurality of second shock absorption sleeves provided at a peripheral surface of the sealing sleeve; the second shock absorption sleeves are elastically fitted between the peripheral surface of the sealing sleeve and the inner wall of the motor casing.

According to the technical solutions given above, the present invention has the following technical effects:

The present invention provides a first shock absorption assembly between the input end of the motor body and the fixing seat, wherein the first shock absorption assembly comprises a first connecter, a first buffer piece, a second connecter, and a second buffer piece, sequentially connected with one another, wherein the first connecter and the second connecter are both made of hard materials to ensure connection strength between the motor body and the fixing seat and prevent angular displacement of the motor body during operation, while the first buffer piece and the second buffer piece are both made of soft materials to prevent direct contact between the first connecter and the second connecter as well as direct contact between the second connecter and the fixing seat, so that when the components are co-axially connected, the first buffer piece 33 an the second buffer piece can achieve buffering and shock absorption effects.

Compared with conventional structure in which the motor body and the fixing seat are in direct and rigid contact, the connecting structure as explained above can reduce or even eliminate shock transmission and thereby preventing noise. Therefore, the noise reduction and shock absorption effect between the motor casing and the input end of the tubular motor can be enhanced, thereby improving the quality of the tubular motor and make it suitable for use in situations that require silent operation.

DETAILED DESCRIPTION OF THE INVENTION

Figure 1:
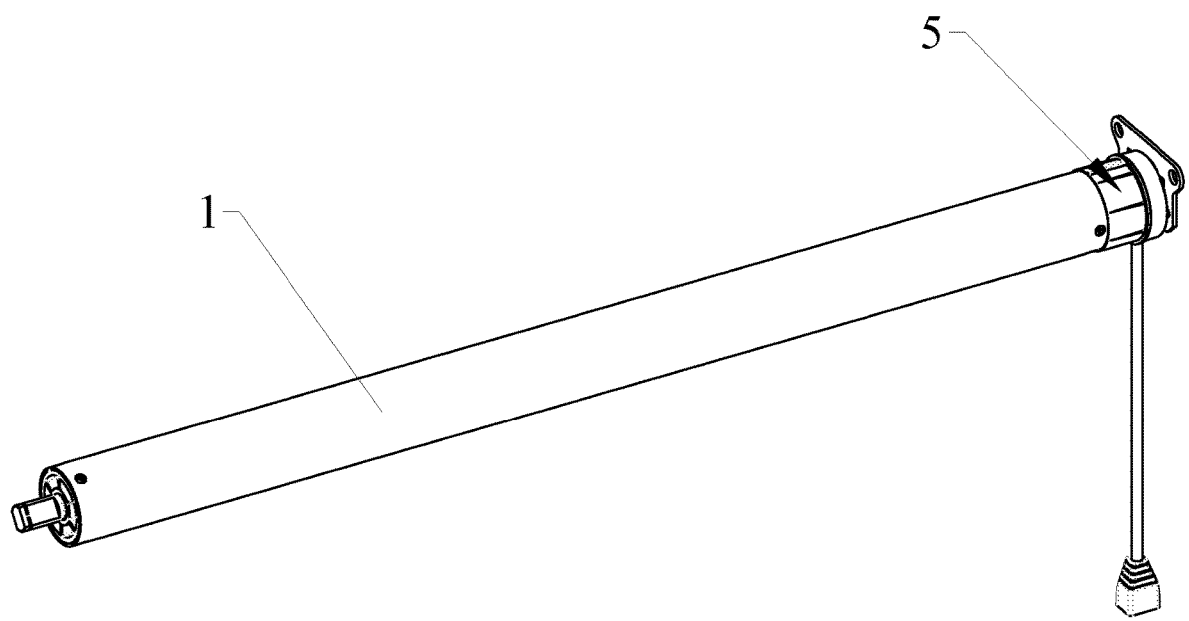
FIG. 1 is a perspective view of the tubular motor according to an embodiment of the present invention.
Figure 2:
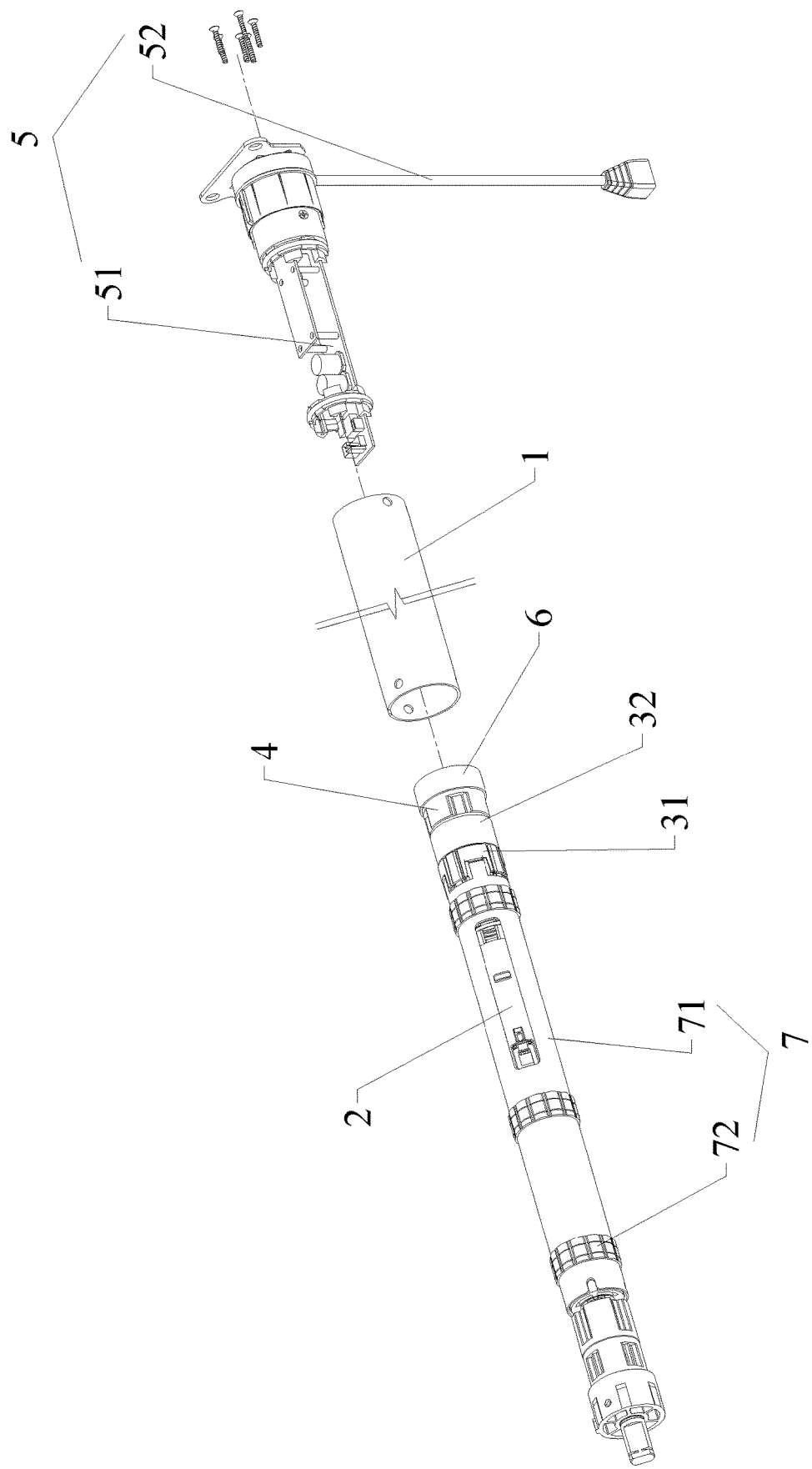
FIG. 2 is an exploded view of the tubular motor according to an embodiment of the present invention.
Figure 3:
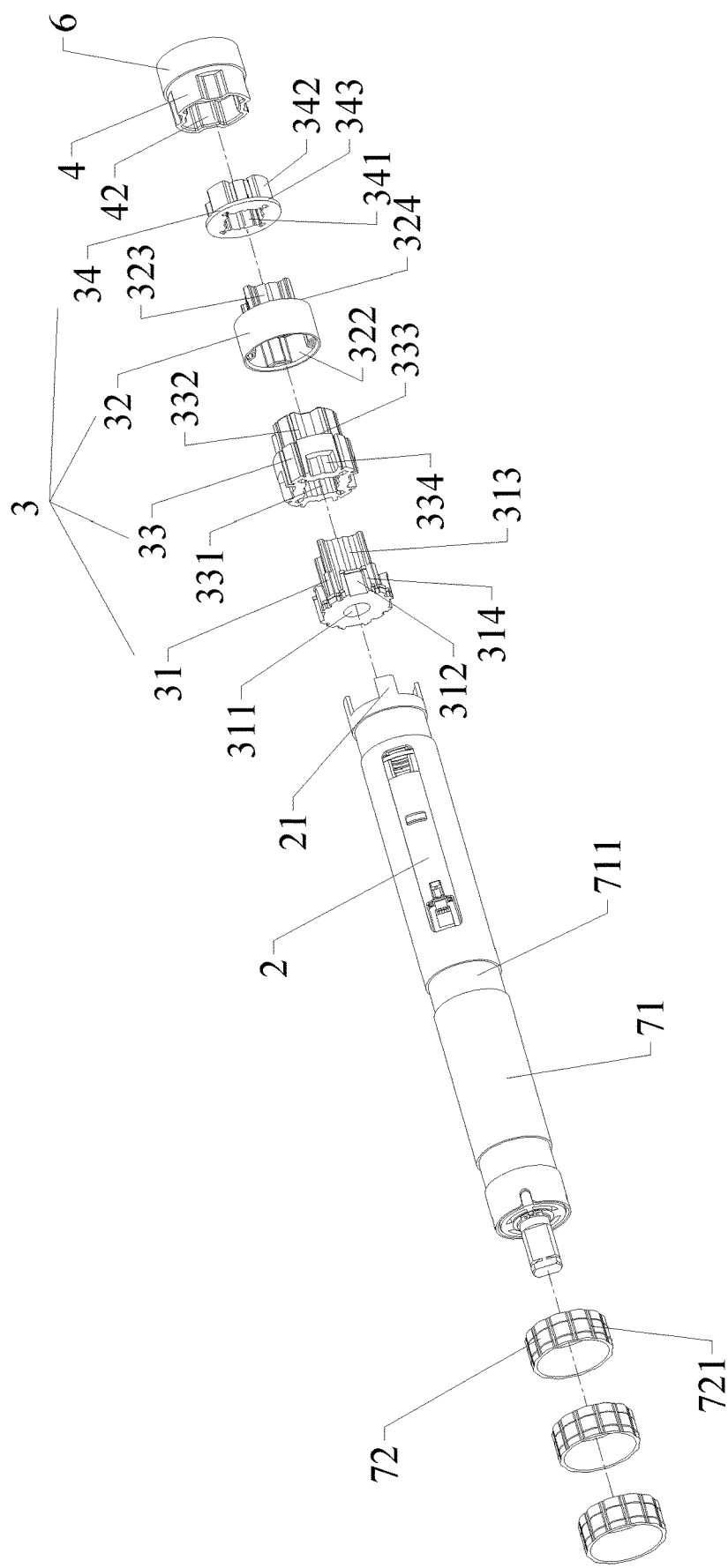
FIG. 3 is a first exploded view of the noise reduction and shock absorption structure applied to an input end of the tubular motor according to an embodiment of the present invention.
Figure 4:
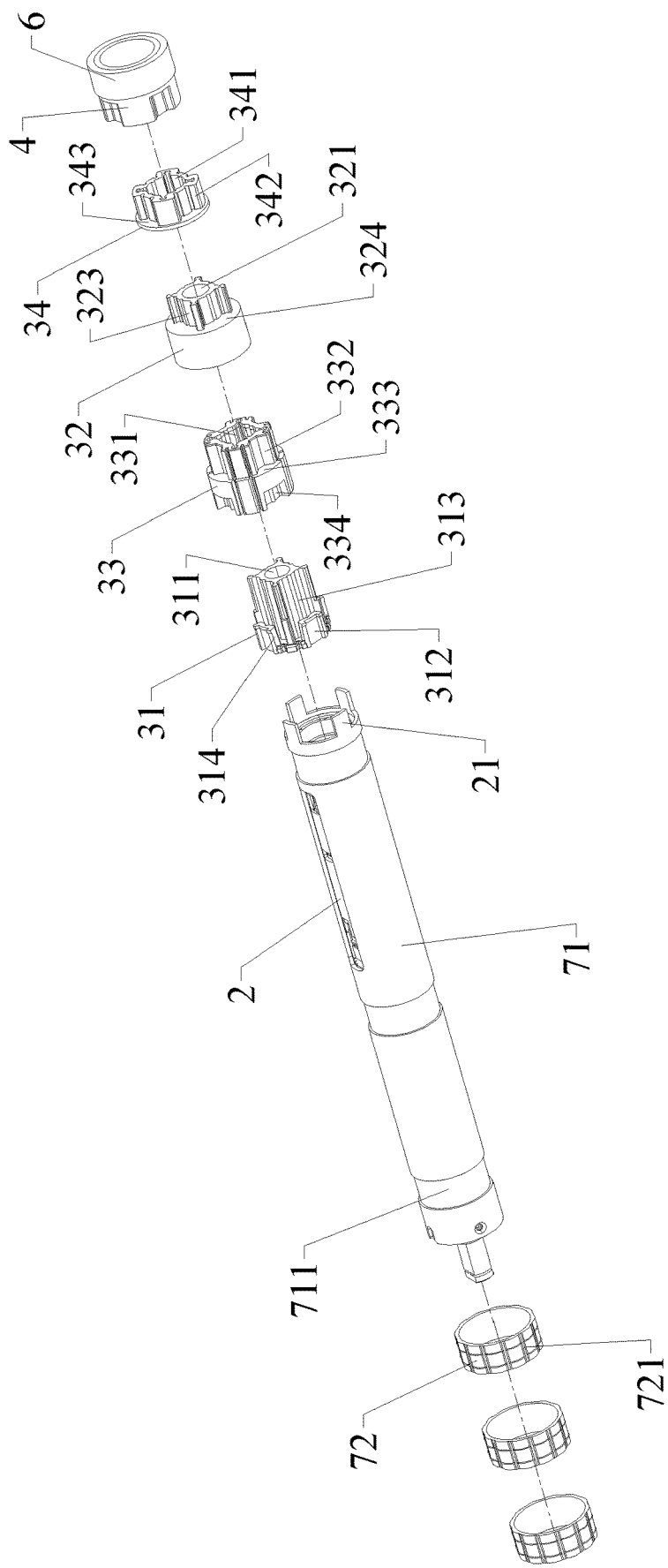
FIG. 4 is a second exploded view of the noise reduction and shock absorption structure applied to the input end of the tubular motor according to an embodiment of the present invention.
Figure 5:
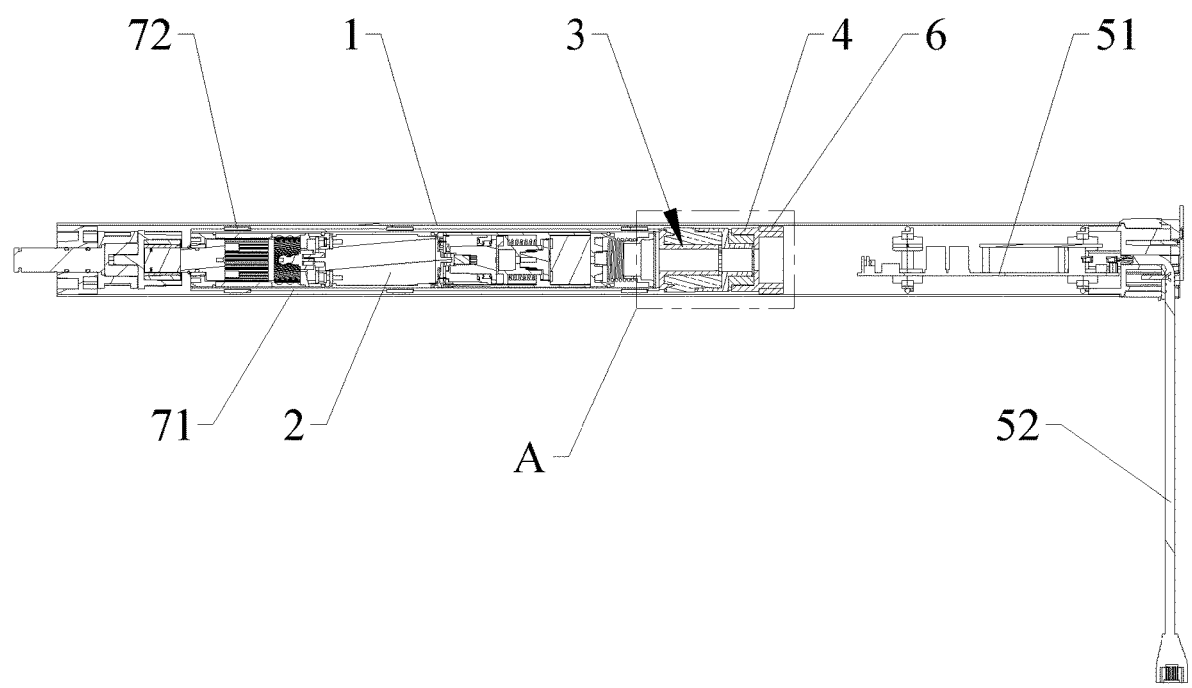
FIG. 5 is a sectional view of the tubular motor according to an embodiment of the present invention.
Figure 6:
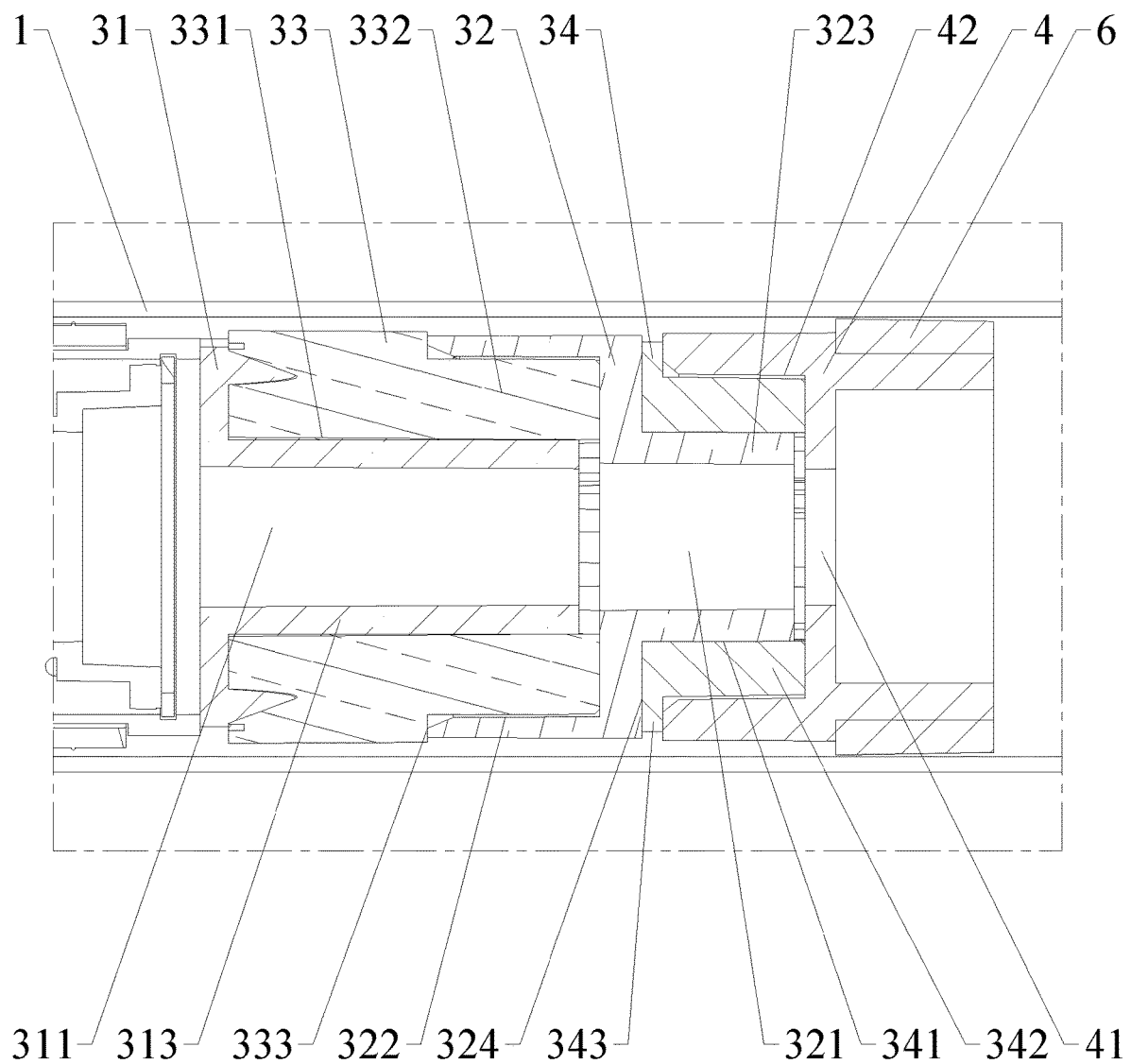
FIG. 6 is an enlarged view of portion A of FIG. 5.

With reference to FIG. 1 to FIG. 6, the present invention discloses a noise reduction and shock absorption structure for an input end of a tubular motor, comprising a motor casing 1, a motor body 2, a first shock absorption assembly 3, and a fixing seat 4.

The motor body 2 is provided inside the motor casing 1.

An input end of the motor body 2 is an end that is connected with an electronic component assembly 5 of the tubular motor.

The fixing seat 4 is also provided inside the motor casing 1 and fixed at an inner wall of the motor casing 1; a first wiring hole 41 is opened through the fixing seat 4.

The first shock absorption assembly 3 comprises a first connecter 31 and a second connecter 32, both made of hard materials, and also comprises a first buffer piece 33 and a second buffer piece 34, both made of soft materials. A second wiring hole 311 is opened through the first connecter 31, and a third wiring hole 321 is opened through the second connecter 32.

The input end of the motor body 2, the first connecter 31, the second connecter 32, and the fixing seat 4 are sequentially and co-axially connected, so that the motor body 2 and the fixing seat 4 are indirectly but still co-axially connected so as to fix the motor body 2 in position and prevented the motor body 2 from being angularly displaced after it is installed in the motor casing 1.

The first buffer piece 33 is positioned at a connecting portion between the first connecter 31 and the second connecter 32; the second buffer piece 34 is positioned at a connecting portion between the second connecter 32 and the fixing seat 4 to prevent direct contact between the first connecter 31 and the second connecter 32, and also prevent direct contact between the second connecter 32 and the fixing seat 4.

An embodiment of the present invention is described below.

The above-mentioned hard materials are materials that are hard and not easy to deform, such as metals and high-strength plastics. Said high-strength plastics can be PA66+ 33% GF (a composite material of nylon 66 and glass fiber, which is an existing material); the above-mentioned soft materials are elastic materials able to provide buffering effect, such as rubber and silicone, and a specific example of soft materials is TPV45° (thermoplastic vulcanizate with a shore hardness of 45, which is an existing material). In the present embodiment, the first connecter 31 and the first buffer piece 33, as well as the second buffer piece 34 and the fixing seat 4, are in each case formed integrally as a whole by using overmolding technique in order to enhance the connection strength, reduce components required during assembly, and increase assembly efficiency.

An end surface of the input end of the motor body 2 is provided with a plurality of first position limiting plates 21 arranged on a periphery of the end surface. One end portion of the first connecter 31 facing towards the motor body 2 is provided with a plurality of first position limiting grooves 312 corresponding to the first position limiting plates 21; the first position limiting grooves 312 are arranged around said one end portion of the first connecter 31 facing towards the motor body. The first position limiting plates 21 are inserted into the first position limiting grooves 312 respectively so as to achieve co-axial connection between the motor body 2 and the first connecter 31. In the present embodiment, the first position limiting plates 21 extend out of the motor body 2 and along an axial direction of the motor body 2 and surround an axis of the motor body 2 and spaced apart from one another by equal intervals.

The first connecter 31 and the second connecter 32, as well as the second connecter 32 and the fixing seat 4, are in each case connected by spline connection so as to achieve co-axial connection. The first buffer piece 33 achieves spline connection with the first connecter 31 as well as with the second connecter 32; the second buffer piece 34 achieves spline connection with the second connecter 32 as well as with the fixing seat 4. Detailed connections are explained below:

One end of the first connecter 31 facing towards the second connecter 32 is provided with a first spline head 313; the second wiring hole 311 extends through an end surface of the first spline head 313; one end of the first buffer piece 33 is provided with a first spline hole 331, and another end of the first buffer piece 33 is provided with a second spline head 332; the first spline hole 331 extends through an end surface of the second spline head 332; one end of the second connecter 32 facing towards the first connecter 31 is provided with a second spline hole 322; the first spline head 313 is sleeved by the first spline hole 331; the second spline head 332 is sleeved by the second spline hole 322.

Further, a first stepped portion 333 is formed around a peripheral surface of the first buffer piece 33; the second spline head 332 is formed on an end surface of the first stepped portion 333 and projected out therefrom; an end surface of the second connecter 32 abuts against the first stepped portion 333 to prevent direct contact between the first connecter 31 and the second connecter 32, in other words, rigid and direct contact between hard materials is prevented so as to effectively reduce shock transmission and noise.

Further, a peripheral surface of the first connecter 31 is provided with a plurality of second position limiting plates 314; an end surface of the first buffer piece 33 facing towards the first connecter 31 is provided with a plurality of second position limiting grooves 334 corresponding to the second position limiting plates 314; the second position limiting plates 314 are inserted into the second position limiting grooves 334 respectively so as to achieve position limiting effect between the first connecter 31 and the first buffer piece 33 both axially and circumferentially, and this can further enhance the co-axial connection strength between the first connecter 31 and the first buffer piece 33, and can also limit a depth which the first spline head 313 is inserted into the first buffer piece 33 and also prevent rigid contact between first connecter 31 and the second connecter 32. In the present embodiment, the second position limiting plates 314 extend along an outer side surface of the first connecter 31 in accordance with an axial direction of the first connecter 31, and surround an axis of the first connecter 31 and spaced apart from one another by equal intervals. Also, the first position limiting grooves 312 are provided on outer side surfaces of the second position limiting plates 314 respectively.

An end of the second connecter 32 facing towards the fixing seat 4 is provided with a third spline head 323; the third wiring hole 321 extends through an end surface of the third spline head 323; one end of the second buffer piece 34 is provided with a third spline hole 341, and another end of the second buffer piece 34 is provided with a fourth spline head 342; the third spline hole 341 extends through an end surface of the fourth spline head 342; one end of the fixing seat 4 facing towards the second connecter 32 is provided with a fourth spline hole 42; the third spline head 323 is sleeved by the third spline hole 341; the fourth spline head 342 is sleeved by the fourth spline hole 42.

Further, a second stepped portion 324 is formed around a peripheral surface of the second connecter 32; the third spline head 323 is formed on an end surface of the second stepped portion 324 and projected out therefrom; a third stepped portion 343 is formed around a peripheral surface of the second buffer piece 34; the fourth spline head 342 is formed on an end surface of the third stepped portion 343 and projected out therefrom; an end surface of the second buffer piece 34 abuts against the second stepped portion 324, and an end surface of the fixing seat 4 abuts against the third stepped portion 343 to prevent direct contact between the fixing seat 4 and the second connecter 32, in other words, rigid and direct contact between hard materials is prevented so as to effectively reduce shock transmission and noise.

A peripheral surface of the fixing seat 4 is provided with a first shock absorption sleeve 6; the first shock absorption sleeve 6 is elastically fixed between the fixing seat 4 and the inner wall of the motor casing 1 so as to achieve buffering and shock absorption functions between the fixing seat 4 and the motor casing 1. Besides, due to friction fit of fixing seat 4 and the inner wall of the motor casing 1 through the first shock absorption sleeve 6, the fixing seat 4 is prevented from angular displacement with respect to the inner wall of the motor casing 1. Accordingly, the fixing seat 4 is fixed at the inner wall of the motor casing 1. In an actual product of the present invention, a surface of the first shock absorption sleeve 6 can be provided with anti-slippery patterns to enhance anti-slippery performance.

A second shock absorption assembly 7 is provided between a peripheral surface of the motor body 2 and the inner wall of the motor casing 1; the second shock absorption assembly 7 comprises a sealing sleeve 71 sleeving the motor body 2 so that the noise generated during operation of the motor body 2 will be retained inside the sealing sleeve 71 so as to effectively reduce noise.

Further, the second shock absorption assembly 7 also comprises a plurality of second shock absorption sleeves 72 provided at a peripheral surface of the sealing sleeve 71; the second shock absorption sleeves 72 are elastically fitted between the peripheral surface of the sealing sleeve 71 and the inner wall of the motor casing 1 to absorb the vibration of the motor body 2 itself during operation so as to prevent noise caused by bumping (impact) of the motor body 2 against the motor casing 1.

Further, the peripheral surface of the sealing sleeve 71 are provided with a plurality of mounting grooves 711 in which the second shock absorption sleeves 72 are mounted; the mounting grooves 711 limit the mounting positions of the second shock absorption sleeves 72 so as to prevent the second shock absorption sleeves 72 from displacement due to the vibration of the motor body 2 during operation, thereby ensuring the performance of the second shock absorption sleeves 72. In the present embodiment, there are three second shock absorption sleeves 72, and correspondingly, there are also three mounting grooves 711.

Further, a peripheral surface of each of the second shock absorption sleeves 72 is provided with linear patterns 721 orienting along an axial direction of the tubular motor; the linear patterns 721 are either projected out of or recessed from the peripheral surface of the corresponding second shock absorption sleeve 72. Therefore, gaps in communication with an interior of the motor casing 1 are formed between each of the second shock absorption sleeves 72 and the inner wall of the motor casing 1, and this can prevent the second shock absorption sleeves 72 from being entirely attached to and in contact with the inner wall of the motor casing 1. As such, air inside the gaps can be utilized to reduce or eliminate noise.

The electronic component assembly 5 comprises electronic components to control and supply power to the motor body 2, and may comprise a circuit board 51 and a power cable 52. The electronic component assembly 5 is a prior art and will not be described in detail herein. However, it should be noted that wires that connect the circuit board 51 with the motor body 2 will sequentially pass through the first wiring hole 41, the third wiring hole 321 and the second wiring hole 311.

According to the technical solutions provided above, the present invention provides a first shock absorption assembly 3 between the input end of the motor body 2 and the fixing seat 4, wherein the first shock absorption assembly 3 comprises a first connecter 31, a first buffer piece 33, a second connecter 32, and a second buffer piece 34, sequentially connected with one another, wherein the first connecter 31 and the second connecter 32 are both made of hard materials to ensure connection strength between the motor body 2 and the fixing seat 4 and prevent angular displacement of the motor body 2 during operation, while the first buffer piece 33 an the second buffer piece 34 are both made of soft materials to prevent direct contact between the first connecter 31 and the second connecter 32 as well as direct contact between the second connecter 32 and the fixing seat 4, so that when the components are co-axially connected, the first buffer piece 33 an the second buffer piece 34 can achieve buffering and shock absorption effects. Compared with conventional structure in which the motor body 2 and the fixing seat 4 are in direct and rigid contact, the connecting structure as explained above can reduce or even eliminate shock transmission and thereby preventing noise. Therefore, the noise reduction and shock absorption effect between the motor casing and the input end of the tubular motor can be enhanced, thereby improving the quality of the tubular motor and make it suitable for use in situations that require silent operation.

What is claimed is:

1. A noise reduction and shock absorption structure for an input end of a tubular motor, comprising a motor casing, a motor body, a first shock absorption assembly, and a fixing seat;

the motor body is provided inside the motor casing;

the fixing seat is also provided inside the motor casing and fixed at an inner wall of the motor casing; a first wiring hole is opened through the fixing seat;

the first shock0 absorption assembly comprises a first connecter and a second connecter, both made of hard materials, and also comprises a first buffer piece and a second buffer piece, both made of soft materials; a second wiring hole is opened through the first connecter, and a third wiring hole is opened through the second connecter;

an input end of the motor body, the first connecter, the second connecter, and the fixing seat are sequentially and co-axially connected;

the first buffer piece is positioned at a connecting portion between the first connecter and the second connecter; the second buffer piece is positioned at a connecting portion between the second connecter and the fixing seat to prevent direct contact between the first connecter and the second connecter, and also prevent direct contact between the second connecter and the fixing seat.

2. The noise reduction and shock absorption structure of claim 1, wherein said hard materials are metals or high-strength plastics; said soft materials are rubber or silicone.

3. The noise reduction and shock absorption structure of claim 1, wherein an end surface of the input end of the motor body is provided with a plurality of first position limiting plates arranged on a periphery of the end surface of the input end of the motor body; one end portion of the first connecter facing towards the motor body is provided with a plurality of first position limiting grooves corresponding to the first position limiting plates; the first position limiting grooves are arranged around said one end portion of the first connecter facing towards the motor body; the first position limiting plates are inserted into the first position limiting grooves respectively.

4. The noise reduction and shock absorption structure of claim 1, wherein one end of the first connecter facing towards the second connecter is provided with a first spline head; the second wiring hole extends through an end surface of the first spline head; one end of the first buffer piece is provided with a first spline hole, and another end of the first buffer piece is provided with a second spline head; the first spline hole extends through an end surface of the second spline head; one end of the second connecter facing towards the first connecter is provided with a second spline hole; the first spline head is sleeved by the first spline hole; the second spline head is sleeved by the second spline hole.

5. The noise reduction and shock absorption structure of claim 4, wherein a first stepped portion is formed around a peripheral surface of the first buffer piece; the second spline head is formed on an end surface of the first stepped portion and projected out therefrom; an end surface of the second connecter abuts against the first stepped portion.

6. The noise reduction and shock absorption structure of claim 4, wherein a peripheral surface of the first connecter is provided with a plurality of second position limiting plates; an end surface of the first buffer piece facing towards the first connecter is provided with a plurality of second position limiting grooves corresponding to the second position limiting plates; the second position limiting plates are inserted into the second position limiting grooves respectively.

7. The noise reduction and shock absorption structure of claim 1, wherein an end of the second connecter facing towards the fixing seat is provided with a third spline head; the third wiring hole extends through an end surface of the third spline head; one end of the second buffer piece is provided with a third spline hole, and another end of the second buffer piece is provided with a fourth spline head; the third spline hole extends through an end surface of the fourth spline head; one end of the fixing seat facing towards the second connecter is provided with a fourth spline hole; the third spline head is sleeved by the third spline hole; the fourth spline head is sleeved by the fourth spline hole.

8. The noise reduction and shock absorption structure of claim 7, wherein a second stepped portion is formed around a peripheral surface of the second connecter; the third spline head is formed on an end surface of the second stepped portion and projected out therefrom; a third stepped portion is formed around a peripheral surface of the second buffer piece; the fourth spline head is formed on an end surface of the third stepped portion and projected out therefrom; an end surface of the second buffer piece abuts against the second stepped portion, and an end surface of the fixing seat abuts against the third stepped portion.

9. The noise reduction and shock absorption structure of claim 1, wherein a peripheral surface of the fixing seat is provided with a first shock absorption sleeve; the first shock absorption sleeve is elastically fixed between the fixing seat and the inner wall of the motor casing.

10. The noise reduction and shock absorption structure of claim 1, wherein a second shock absorption assembly is provided between a peripheral surface of the motor body and the inner wall of the motor casing; the second shock absorption assembly comprises a sealing sleeve sleeving the motor body, and a plurality of second shock absorption sleeves provided at a peripheral surface of the sealing sleeve; the second shock absorption sleeves are elastically fitted between the peripheral surface of the sealing sleeve and the inner wall of the motor casing.

\* \* \* \* \*